No. 883,564. PATENTED MAR. 31, 1908.
W. B. PARRISH.
FERTILIZER DISTRIBUTER.
APPLICATION FILED JAN. 28, 1908.

Witnesses

Inventor
W. B. Parrish

By R. H. A. M. Lacey, Attorneys

UNITED STATES PATENT OFFICE.

WASHINGTON B. PARRISH, OF KARA, VIRGINIA.

FERTILIZER-DISTRIBUTER.

No. 883,564.  Specification of Letters Patent.  Patented March 31, 1908.

Application filed January 28, 1908. Serial No. 413,078.

*To all whom it may concern:*

Be it known that I, WASHINGTON B. PARRISH, citizen of the United States, residing at Kara, in the county of Lunenburg and State of Virginia, have invented certain new and useful Improvements in Fertilizer-Distributers, of which the following is a specification.

This invention appertains to agricultural machinery and more particularly to the type designed for distributing fertilizer and seed either in rows or broadcast.

The present invention has for its object to devise distributing mechanism of novel formation and to provide a machine of unique structure, admitting of adjusting the distributing mechanism to a nicety, so as to positively discharge a given amount of material for a given length of row or surface.
For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which.

Figure 1:
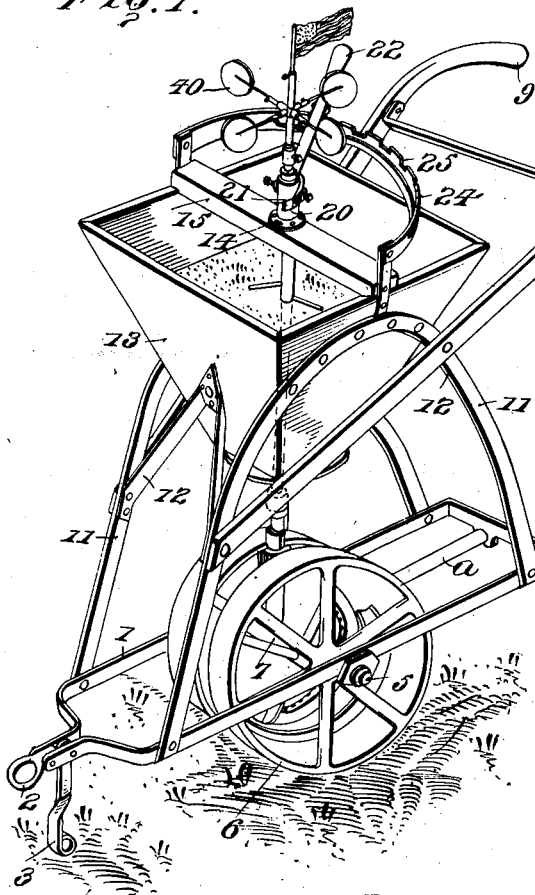
Figure 2:
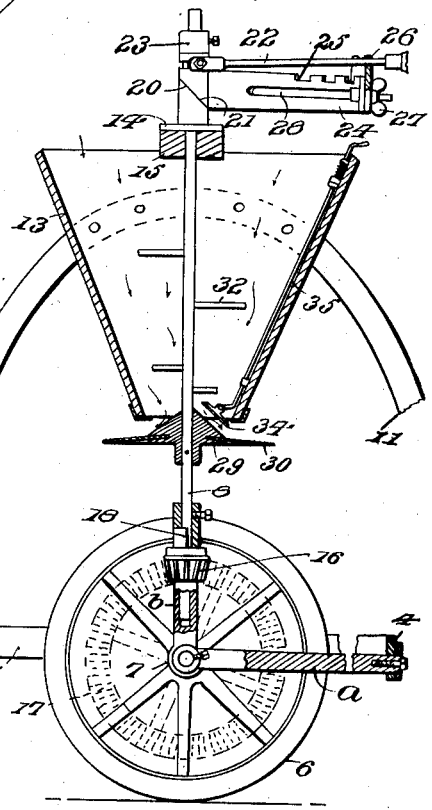
Figure 4:
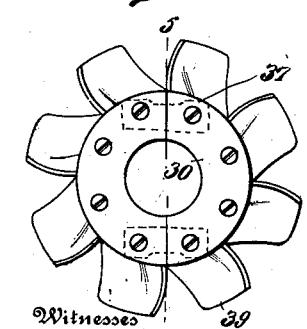
Figure 3:
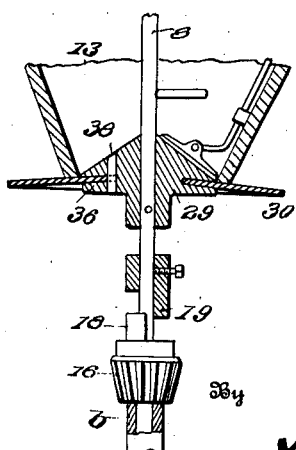
Figure 5:
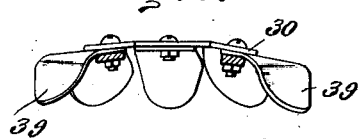

Figure 1 is a perspective view of an agricultural implement of the type aforesaid embodying the invention. Fig. 2 is a vertical central longitudinal section thereof, parts being broken away. Fig. 3 is a vertical section of the lower portion of the hopper, shaft, distributer and clutch, showing the parts on a larger scale. Fig. 4 is a top plan view of a modified form of distributer. Fig. 5 is a section on the line 5—5 of Fig. 4.

Corresponding and like parts are referred to in the following description and indicated in all the views of the drawings by the same reference characters.

The main frame comprises longitudinal bars 1 which are brought together at their front ends and receive between them a clevis 2 and a pivot foot 3, the rear ends being connected by means of a transverse bar 4. An axle 5 mounted in bearings applied to the longitundinal bar 1 receives ground wheels 6 which are transversely spaced and constructed so as to cover or give a slight lift to the rows. A bracket 7 comprising lateral, vertical and rear members forming a cluster, receives the axle 5 and has its rear member *a* connected to the transverse bar 4, whereas its vertical member *b* is formed with an opening in which the lower end of a vertical shaft 8 is stepped. Handle bars 9 are clipped or otherwise secured at their lower ends to arches 11 projected up from the longitudinal bars 1, said handle bars being connected near their upper ends by means of a cross bar 10. A frame is secured to the bars 1 and handle bars 9 and consists of the arches 11 and braces 12, the latter being of V-form and connecting the front and the rear members of the arches. A hopper 13 is supported by the said frame the members of which are secured thereto by suitable fastenings.

The vertical shaft 8 is mounted near its upper end in a bearing 14, which is attached to a cross bar 15 secured to the upper portion of the hopper 13. The shaft 8 passes vertically through the hopper 13 and is provided near its lower end with a beveled pinion 16 which is in mesh with a bevel gear wheel 17 secured to or forming a part of one of the ground wheels 6. The bevel pinion 16 is loose upon the shaft 8 and is provided with a clutch member 18. A complemental clutch member 19 is secured to the shaft 8 and operates with the clutch member 18 to cause the pinion 16 and shaft 8 to rotate in unison. The shaft 8 is adapted to receive a vertical movement for the two-fold purpose of throwing the shaft into and out of gear and regulating the discharge of the fertilizer or grain. To effect vertical adjustment of the shaft 8, a lifting mechanism coöperates therewith, the same consisting of complemental cams 20 and 21, the cam 20 being formed at the upper end of the bearing 14 and the cam 21 being provided at the lower end of a sleeve which is loose upon the shaft 8, and has an operating lever 22 connected thereto. A set collar 23 secured to the shaft 8 above the cam 21 limits the upward movement of said cam. The operating lever 22 is forked at its inner end, the forked member having pivotal connection with the cam 21. As the cam 21 moves upward by riding upon the cam 20, it effects a lifting of the shaft 8 by coming in contact with the said set collar 23. To hold the operating lever 22 in adjusted position, a curved bar 24 is provided, and is connected at its ends to the hopper. The upper edge of the bar 24 is formed with a series of notches 25 in any one of which the operating lever 22 is adapted to fit, so as to hold same when moved to the required position. To provide for a nicety of adjustment, a stop 26 is adjustable on the curved bar 24, and consists of a plate notched in its upper end to receive the operating lever 22, said plate being secured to the curved bar by means of a fastening 27, passing therethrough and operating in a slot 28 formed in the curved bar 24. When the operating lever 22 is moved to the desired position, to secure discharge of the proper amount of material, and should it fail to register with any one of the notches 25, the stop 26 may be moved upon the curved bar to bring the notch in its upper end in position to receive the operating lever, after which the stop 26 is secured by the fastening 27.

A distributer is secured to the vertical shaft 8 and consists of a cone 29 and a plate 30, the cone being arranged with the apex uppermost. The distributer is adapted to close the lower end of the hopper. The distance between the lower edge of the hopper and the top side of the distributer determines the discharge. When the shaft 8 is moved upward to effect disengagement of the clutch members 18 and 19 to throw the machine out of gear, the distributer is also moved upward and closes the lower end of the hopper, to shut off discharge of any material. The distributer may be secured to the shaft 8 in any manner. The plate 30 projects outward from the cone 29 and is composed of sections, the latter being fitted in a groove 36 formed in a side of the cone 29 near the base thereof, the sections being connected by means of ties 37, or in any convenient way. A pin 38 passed through an opening formed in the cone 29 engages with the plate 30 and causes the plate to rotate with the cone. The cone 29 is adapted to enter the opening in the lower end of the hopper and serves to initially direct the fertilizer or grain outward. The plate 30 has an approximately horizontal arrangement and throws the material outward in the operation of the machine. By having the plate 30 detachably connected with the cone 29, it may be replaced by plates varying in diameter according to the particular work in hand. The plate shown in Figs. 4 and 5 is provided with cups 39 which receive the grain or fertilizer from the plate 30 and scatter the same broadcast. The cups 39 may be of any construction or formation and attached to the plate 30 in any manner.

A rotary fan 40 may be fitted to the upper end of the vertical shaft 8 so as to revolve therewith, the fan blade being adjustable so as to throw the current of air either rearward to cool the operator upon a hot and sultry day, or to throw the current either downward or to one side, thereby preventing the fertilizer or compost being thrown into the face of the operator.

To prevent choking of the hopper the shaft 8 is provided at intervals in its length with fingers 32 which act as stirrers or agitators to loosen and lighten the fertilizer or grain and insure positive travel thereof. A scraper 34 is arranged to extend over the distributer and clear the same of fertilizer or other material. The scraper 34 is attached to a rod 35 passing through the hopper and held to a side thereof by keepers.

Having thus described the invention, what is claimed as new is:

1. In an implement of the character set forth, the combination of a hopper having a discharge opening in its lower end, a cone having an annular groove in its side, and a sectional plate fitted in the groove of said cone.

2. In combination, a hopper having a discharge opening in its lower end, a vertical shaft passed through the hopper, actuating mechanism for imparting rotary movement to said shaft, a clutch between the shaft and actuating mechanism and comprising separable members, means for raising and lowering the shaft to throw it into and out of gear, and a distributer secured to said shaft and movable therewith, and adapted to open and close the lower end of the hopper, said distributer comprising a cone to enter the lower portion of the hopper, and a plate to throw the material outward.

3. In combination, a hopper having a discharge opening in its bottom, a shaft passed vertically through the hopper, a distributer secured to said shaft and adapted to close the lower end of the hopper, actuating means for imparting rotary movement to said shaft, coöperating cams to effect vertical movement of said shaft, an operating lever having connection with said shaft, a notched bar for securing the operating lever in an off-set position, and an adjustable stop adapted to be secured to said notched bar to hold the operating lever when moved to a position between fixed notches of the said notched bar.

4. In an implement of the character specified, the combination of a frame comprising longitudinal bars, wheels mounted in bearings of said frame, side arches projected upward, front and rear braces connecting the front and rear members of said arches, a hopper secured between the upper end of the arches and braces and having an opening in its bottom, a vertical shaft passed through the hopper, gearing connecting the lower end of said shaft with the aforesaid wheels for imparting motion to said shaft and embodying a clutch, a distributer connected to said shaft and adapted to close the lower end of the hopper, and adjusting means for moving said shaft vertically to throw it in or out of gear and to regulate the discharge opening according to the amount of material to be distributed over a given surface.

In testimony whereof I affix my signature in presence of two witnesses.

WASHINGTON B. PARRISH.

Witnesses:
W. N. WOODSON,
V. B. HILLYARD.